(12) United States Patent
Rannow

(10) Patent No.: US 9,383,287 B2
(45) Date of Patent: Jul. 5, 2016

(54) ONLINE SENSOR CALIBRATION FOR ELECTROHYDRAULIC VALVES

(71) Applicant: Eaton Corporation, Cleveland, OH (US)

(72) Inventor: Michael Berne Rannow, Roseville, MN (US)

(73) Assignee: Eaton Corporation, Cleveland, OH (US)

( * ) Notice: Subject to any disclaimer, the term of this patent is extended or adjusted under 35 U.S.C. 154(b) by 297 days.

(21) Appl. No.: 14/105,532

(22) Filed: Dec. 13, 2013

(65) Prior Publication Data

US 2014/0165692 A1 Jun. 19, 2014

Related U.S. Application Data

(60) Provisional application No. 61/745,965, filed on Dec. 26, 2012, provisional application No. 61/737,612, filed on Dec. 14, 2012.

(51) Int. Cl.
*G01L 27/00* (2006.01)
*G01B 7/14* (2006.01)
*F15B 19/00* (2006.01)

(52) U.S. Cl.
CPC .............. *G01L 27/002* (2013.01); *F15B 19/002* (2013.01); *G01B 7/14* (2013.01); *G01L 27/007* (2013.01); *F15B 2211/634* (2013.01); *F15B 2211/6309* (2013.01);
(Continued)

(58) Field of Classification Search
CPC ...... G01B 7/14; G01L 27/005; G01L 27/002; G01L 27/00
See application file for complete search history.

(56) References Cited

U.S. PATENT DOCUMENTS 5,542,286 A * 8/1996 Wang .................... G01N 30/32
                                                            73/1.34
5,868,059 A * 2/1999 Smith .................... F15B 11/006
                                                            137/596.16

(Continued)

FOREIGN PATENT DOCUMENTS

WO WO 2011/064652 A1 6/2011
WO WO 2012/118564 A2 9/2012

OTHER PUBLICATIONS

Partial International Search Report for PCT/US2013/074920 mailed Apr. 11, 2014.

(Continued)

*Primary Examiner* — David A Rogers
(74) *Attorney, Agent, or Firm* — Merchant & Gould P.C.

(57) ABSTRACT

An online method for reconfiguring pressure and position sensors in a hydraulic system is disclosed. In one step, a sensor drift condition, a recalibration request, or an unisolated fault condition is detected. In another step, a system pressure sensor or another sensor, such as a load-sense pressure sensor, is verified as a trusted master reference sensor. Another step includes measuring and recording a first pressure reading at the master reference sensor and first voltage readings associated with first, second, third, and fourth pressure slave sensors at a first pump pressure set point. Another step includes, repeating the previous step at a second pump pressure set point. A new gain and offset for each of the first, second, third, and fourth pressure sensors can be calculated based on a comparison of the recoded first and second pressure readings and the recorded first and second voltage readings.

15 Claims, 8 Drawing Sheets

(52) U.S. Cl.
CPC ...... *F15B 2211/6313* (2013.01); *F15B 2211/8626* (2013.01); *F15B 2211/8752* (2013.01)

(56) References Cited

U.S. PATENT DOCUMENTS

| | | | | |
|---|---|---|---|---|
| 5,916,180 | A * | 6/1999 | Cundari | A61B 5/0053 600/587 |
| 6,705,296 | B2 * | 3/2004 | Horstmann | F02D 41/222 123/494 |
| 6,802,209 | B2 * | 10/2004 | Joos | F02D 41/2441 73/114.43 |
| 7,025,718 | B2 * | 4/2006 | Williams | A61B 1/00082 600/18 |
| 7,124,020 | B2 * | 10/2006 | Vermonet | F02B 77/083 701/114 |
| 7,392,687 | B2 * | 7/2008 | Huang | G01L 25/00 73/1.62 |
| 8,166,795 | B2 | 5/2012 | Gehlhoff et al. | |
| 8,365,894 | B2 * | 2/2013 | Kohlbock | F15B 19/007 192/30 W |
| 2010/0251705 | A1 | 10/2010 | Yuan | |
| 2011/0093229 | A1 | 4/2011 | Ekvall et al. | |

OTHER PUBLICATIONS

International Search Report and Written Opinion for PCT/US2013/074920 mailed Jun. 10, 2014.

* cited by examiner

FIG. 5

| Condition | Data Analysis Result | Action |
|---|---|---|
| 1 | 0 faults relative to Ps | continue recalibration using Ps as reference |
| 2 | 1 fault relative to Ps | continue recalibration using Ps as reference |
| 3 | 2 faults relative to Ps, same service | continue recalibration using Ps as reference |
| 4 | 2 faults relative to Ps, different service | continue recalibration using Ps as reference if 3 faulted sensors agree with Pls (estimate margin from average of 3 faulted sensors), else isolate/recalibrate pump controller |
| 5 | 3 faults relative to Ps | continue recalibration using Pls+margin as reference if 3 faulted sensors agree with Pls (estimate margin from average of 3 faulted sensors), else isolate/recalibrate pump controller instead of recalibrating valve system |
| 6 | 4 faults relative to Ps | continue recalibration using Pls+margin as reference if valve pressure sensors agree with Pls (estimate margin from average of 4 faulted sensors), else isolate/recalibrate pump controller. If standard deviation of 4 faulted sensors is clustered, then likely a Ps, Pls fault. |
| 7 | 1 fault, 2 calibration relative to Ps | recalibrate Ps with 2 calibrations and good sensor and/or selected reference sensor; repeat reference sensor identification protocol at a different pressure |
| 8 | 1 fault, 3 calibration relative to Ps | recalibrate Ps with 3 calibrations and/or selected reference sensor; repeat reference sensor identification protocol at a different pressure |
| 9 | 1 fault, 1 calibration relative to Ps, same service | continue recalibration using Ps as reference |
| 10 | 1 fault, 1 calibration relative to Ps, different service | continue recalibration using Ps as reference if Ps = Pls + margin, else isolate/recalibrate pump controller instead of recalibrating valve system |

| Condition | Data Analysis Result | Action |
|---|---|---|
| 11 | 2 faults on same service, 1 calibration relative to Ps | recalibrate Ps with 1 calibration and good sensor and/or selected reference sensor; repeat reference sensor identification protocol at a different pressure |
| 12 | 2 faults on different service, 1 calibration relative to Ps | recalibrate Ps with 1 calibration and good sensor and/or selected reference sensor; repeat reference sensor identification protocol at a different pressure |
| 13 | 2 faults, 2 calibrations relative to Ps | continue recalibration using Pk+margin as reference if valve pressure sensors agree with Pls (estimate margin from average of 4 faulted sensors), else isolate/recalibrate pump controller. if standard deviation of 4 faulted sensors is clustered, then likely a Ps, Pls fault. |
| 14 | 3 faults, 1 calibration relative to Ps | continue recalibration using Pk+margin as reference if 3 faulted sensors agree with Pls (estimate margin from average of 3 faulted sensors), else isolate/recalibrate pump controller |
| 15 | 3 calibrations relative to Ps | recalibrate Ps to lift head side or nearest calibration and/or selected reference sensor; repeat reference sensor identification protocol at a different pressure |
| 16 | 4 calibrations relative to Ps | recalibrate Ps lift head side or nearest calibration and/or selected reference sensor; repeat reference sensor identification protocol at a different pressure |
| 17 | 1 calibration relative to Ps | recalibrate 1 sensor to Ps; repeat reference sensor identification protocol at a different pressure OR continue recalibration using Ps as reference |
| 18 | 2 calibrations relative to Ps, same service | recalibrate 2 sensors to Ps; repeat reference sensor identification protocol at a different pressure OR continue recalibration using Ps as reference |
| 19 | 2 calibrations relative to Ps, different service | recalibrate 2 sensors to Ps; repeat reference sensor identification protocol at a different pressure OR continue recalibration using Ps as reference |

ONLINE SENSOR CALIBRATION FOR ELECTROHYDRAULIC VALVES

RELATED APPLICATIONS

This application claims priority to U.S. Provisional Application Ser. No. 61/745,965, filed on Dec. 26, 2012 and claims priority to U.S. Provisional Application Ser. No. 61/737,612, filed on Dec. 14, 2012. The entirety of each of U.S. Provisional Applications 61/745,965 and 61/737,612 is hereby incorporated by reference herein.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. In such electro-hydraulic systems, the added reliance on such components has led to the increased prevalence of system faults, including sensor drift. These systems rely on the accuracy of the sensors to achieve accurate flow control and other system functions and control performance can be compromised when the sensors are inaccurate. It is known to recalibrate sensors by removing them from the system and connecting them to a test stand, but this is often not feasible, and is not available on demand or in an online environment in an active work machine. Improvements in sensor recalibration methods are desired.

SUMMARY

An online method for reconfiguring pressure sensors in a hydraulic system is disclosed. In one embodiment, the hydraulic system is associated with a work machine. The hydraulic system may include an electro-hydraulic system having a control system, a system pump, a system pressure sensor, a load-sense pressure sensor, a first valve having a first pressure sensor in fluid communication with a head side or a first side of a first actuator, a second valve having a second pressure sensor in fluid communication with a rod side or second side of the first actuator, a third valve having a third pressure sensor in fluid communication with a head side or a first side of a second actuator, and a fourth valve having a fourth pressure sensor in fluid communication with the rod side or second side of the second actuator. Examples of the first and second actuators are linear actuators and hydraulic motors. In one step, one of a sensor drift condition, a recalibration request, and an unisolated fault condition is detected. In another step, the pressure sensor or the load-sense pressure sensor is verified as a trusted master reference sensor. Another step includes measuring and recording a first pressure reading at the system pressure sensor and first voltage readings associated with the first, second, third, and fourth pressure sensors at a first pump pressure set point. Another step includes, measuring and recording a second pressure reading at the system pressure sensor and second voltage readings associated with the first, second, third, and fourth pressure sensors at a second pump pressure set point. In one step a new gain and offset for each of the first, second, third, and fourth pressure sensors is calculated based on a comparison of the recoded first and second pressure readings and the recorded first and second voltage readings.

The step of verifying that the pressure sensor or the load-sense pressure sensor can be trusted as a master reference sensor can include setting the pump to a predetermined pressure and then commanding the first and third valves to open to the system pump and recording pressures sensed at the system, first, and third pressure sensors. After the first and third valves are closed, another step can be commanding the second and fourth valves to open to the system pump and recording pressures sensed at the system, second, and fourth pressure sensors. Another step includes analyzing the recorded pressures against predefined condition data stored in the control system.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 5 is a table showing possible analytical results and corresponding actions resulting from the procedure shown in FIG. 4.

FIG. 6 is a continuation of the table shown in FIG. 6.

DETAILED DESCRIPTION

Figure 1:
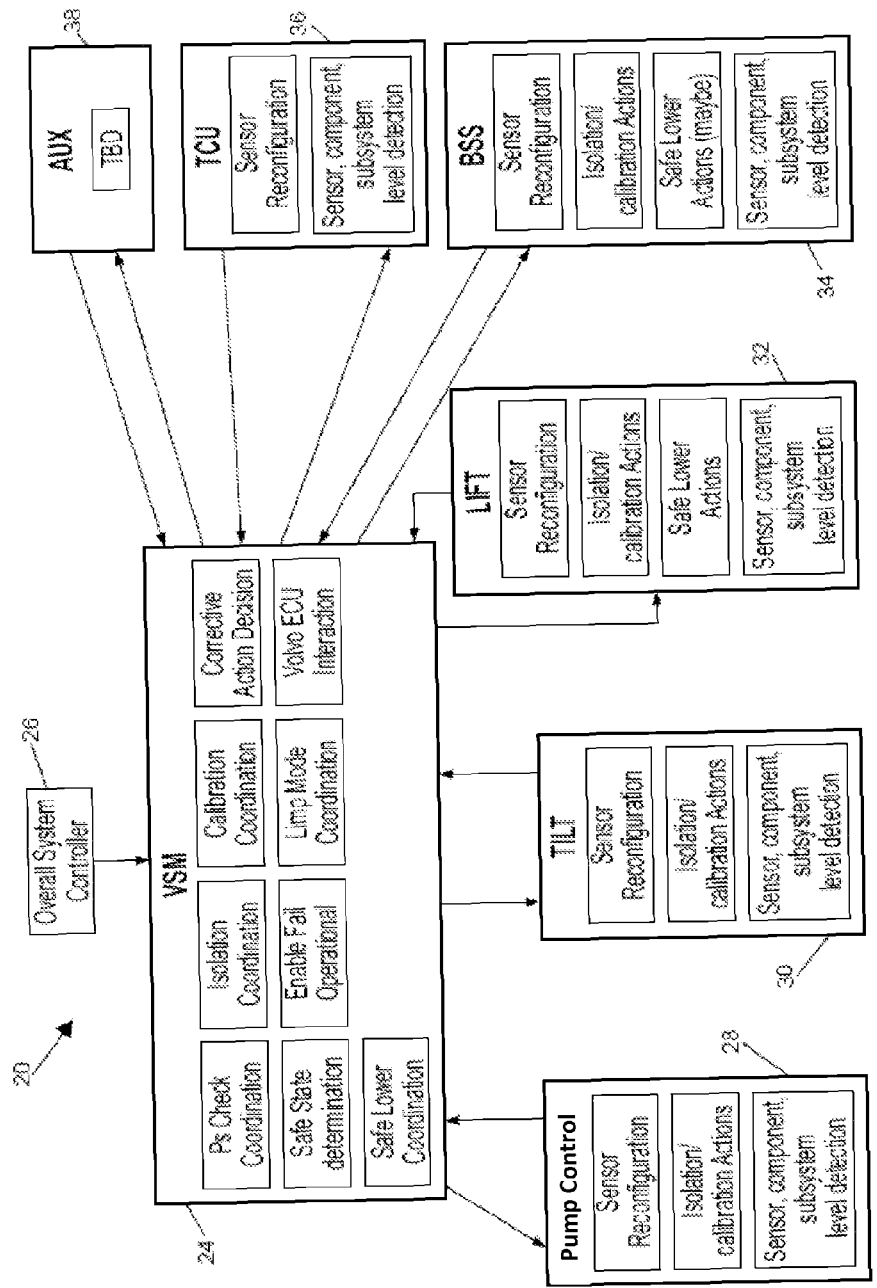
FIG. 1 is a schematic view of a control architecture having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General Architecture Overview

The present disclosure relates generally to fault isolation schemes for use in hydraulic actuation systems. In certain embodiments, a control system architecture is used that is modularized and distributed. By using a modularized approach, the system can be reduced in complexity and can provide enhanced flexibility. By using a distributed architecture with overlapping and redundant fault detection strategies, fault isolation is enhanced. The controllers included in the system include a process and a non-transient storage medium or memory, such as RAM, flash drive or a hard drive.

The memory is for storing executable code, the operating parameters, and the input from the operator interface while the processor is for executing the code.

FIG. 1 illustrates an example fault detection, isolation and reconfiguration (FDIR) architecture 20 in accordance with the principles of the present disclosure. The FDIR architecture 20 is adapted to provide control of a hydraulic actuation system of a vehicle such as a construction vehicle. In one example embodiment, the FDIR architecture 20 can be used to control a hydraulic actuation system of a wheel loader 22 (see FIG. 2). The FDIR architecture 20 includes a supervisory controller 24 adapted to interface with a main controller 26 of the wheel loader 22. The supervisory controller 24 is at a supervisory control level of the hydraulic actuation system. For example, the supervisory controller 24 supervises and interfaces with a plurality of control nodes (e.g. control modules, control subsystems, etc.) that are at a node level of the FDIR architecture 20. The FDIR architecture 20 is configured such that all of the nodes report back through the supervisory controller 24. In certain embodiments, there is no direct cross communication between the nodes. Instead, the nodes interface vertically with the supervisory controller 24, which functions to coordinate operation of the various nodes. As shown at FIG. 1, the nodes can include a pump control node 28, a tilt cylinder control node 30, a lift cylinder control node 32, a boom suspension system control node 34, a tank control unit node 36 and one or more additional auxiliary nodes 38.

Example Vehicle for Application of Recalibration Procedure

Figure 2:
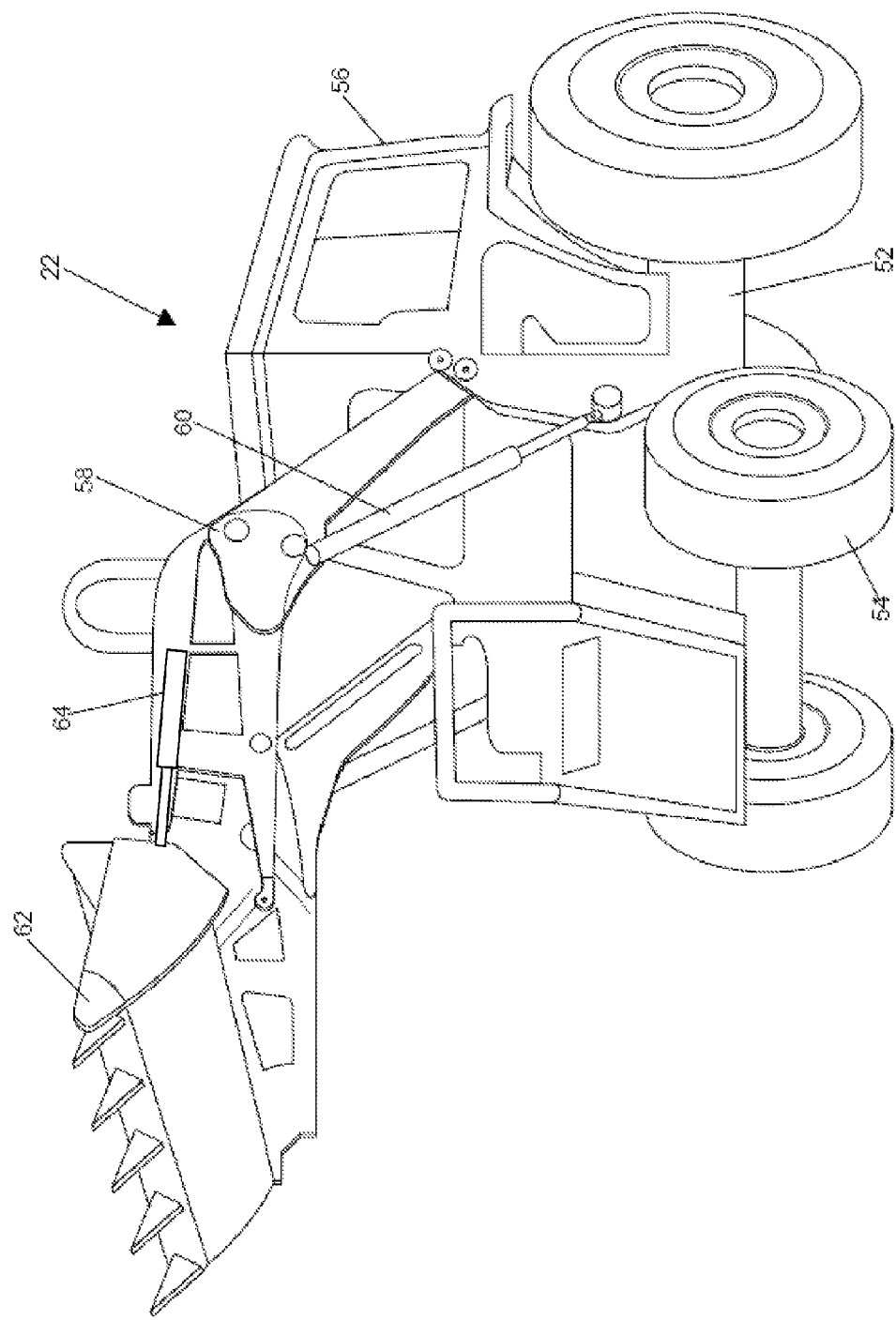
FIG. 2 is a perspective view of a work machine for which the control architecture of FIG. 1 may be used.

FIG. 2 illustrates a wheel loader 22, which is an example of a type of construction vehicle to which aspects of the present disclosure can be applied. The wheel loader includes a chassis or frame 52 supported on wheels 54. A cab 56 is supported on the frame 52. A boom 58 is pivotally connected to the frame 52. A lift cylinder 60 is used to pivot the boom 58 upwardly and downwardly relative to the frame 52. A bucket 62 is pivotally mounted at the end of the boom 58. A tilt cylinder 64 is used to pivot the bucket 62 relative to the boom 58.

Example Architecture Schematic

Figure 3:
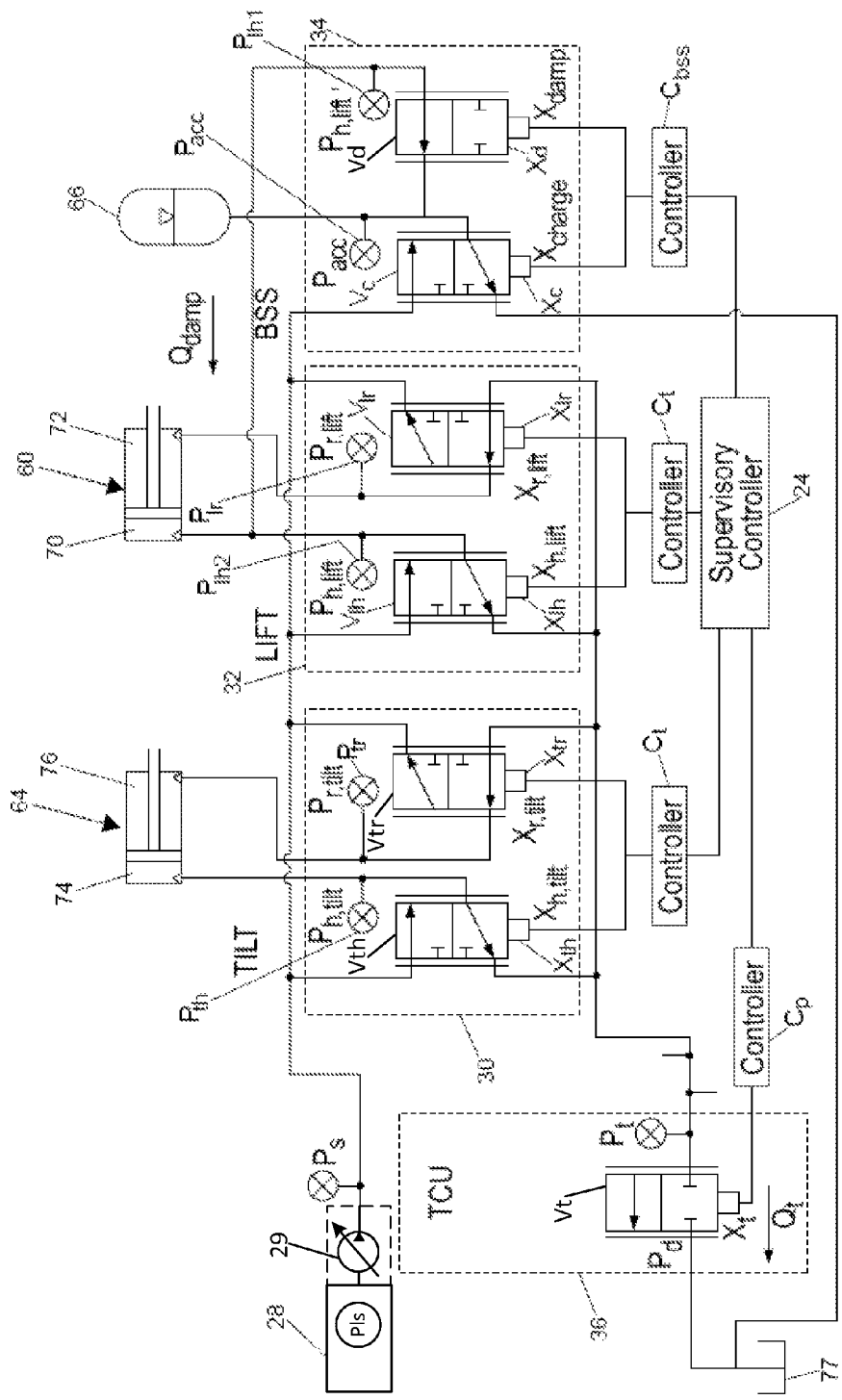
FIG. 3 is a schematic of a hydraulic system and electronic control system that may be associated with the work machine of FIG. 2.

FIG. 3 illustrates a schematic of system architecture suitable for use in controlling the hydraulic actuation system of the wheel loader 22. The architecture includes the supervisory controller 24 that interfaces with the pump control node 28, the tilt cylinder control node 30, the lift cylinder control node 32, the boom suspension system control node 34 and the tank control unit node 36 (auxiliary nodes are not shown). The pump control node 28 controls the hydraulic fluid pressure and flow rate needed to satisfy the flow and pressure requirements of the tilt cylinder control node 30, the lift cylinder control node 32 and the boom suspension system control node 34. The tank control unit node 36 receives the hydraulic fluid flow discharged from the tilt cylinder control node 30, the lift cylinder control node 32 and the boom suspension system control node 34. The tilt cylinder control node 30 controls the hydraulic fluid flow provided to and from the tilt cylinder 64 of the wheel loader 22. The lift cylinder control node 32 controls the hydraulic fluid flow provided to and from the lift cylinder 60 of the wheel loader 22. The boom suspension system control node 34 controls the hydraulic fluid flow provided to and from an accumulator 66. The boom suspension system control node 34 also controls fluid communication between the accumulator 66 and the lift cylinder 60.

The tilt cylinder control node 30 is in fluid communication with the one or more pumps of the pump control node 28 and functions to selectively place a head side 74 or a rod side 76 of the tilt cylinder 64 and fluid communication with the pump or pumps. Similarly, the tilt cylinder control node 30 is in fluid communication with the system tank 77 (i.e., the system reservoir) through the tank control unit node 36 and functions to selectively place the head side 74 or rod side 76 of the tilt cylinder 64 and fluid communication with the tank 77.

The tilt cylinder control module 30 includes a head side flow control valve Vth that selectively places the head side 74 of the tilt cylinder 64 in fluid communication with either the system pump/pumps or the system tank. The tilt cylinder control node 30 also includes a rod side flow control valve Vtr that selectively places the rod side 76 of the tilt cylinder 64 in fluid communication with either the system pump/pumps or the system tank. Valve position sensors Xth and Xtr are provided for respectively sensing the spool positions (i.e., the sensors detect positions of valve spools within valve sleeves, such as LVDT type sensors) of the head side flow control valve Vth and the rod side flow control valve Vtr. Additionally, pressure sensors Pth and Ptr are provided for respectively sensing the head side and rod side pressures of the tilt cylinder 64. In one embodiment, the pressure sensors in the system are strain-based pressure sensors. The tilt cylinder control node 30 also includes a component controller Ct that controls operation of the valves Vth, Vtr based on commands (e.g., mode, pressure or spool position demands, etc.) received from a supervisory controller 24 and feedback provided by the sensors of the node. The component controller Ct also monitors the node for failure conditions and reports any detected failure conditions to the supervisory controller 24 as raised fault flags.

The lift cylinder control node 32 is in fluid communication with one or more pumps of the pump control node 28 and functions to selectively place the one or more pumps in fluid communication with a head side 70 or a rod side 72 of the lift cylinder 60. Similarly, the lift cylinder control node 32 is in fluid communication with the tank 77 through the tank control unit node 36 and is configured to selectively place the head side 70 and the rod side 72 of the boom cylinder 60 in fluid communication with the tank 77.

The lift cylinder control node 32 includes a head side flow control valve Vlh and a rod side flow control valve Vlr. The head side flow control valve Vlh is configured to selectively place the head side 70 of the boom cylinder 60 in fluid communication with either the one or more pumps of the pump control node 28 or the system tank 77. The rod side flow control valve Vlr is configured to selectively place a rod side 72 of the boom cylinder 60 in fluid communication with either one of the system pumps or the system tank 77. The lift cylinder control mode 32 further includes a head side valve position sensor Xlh for sensing a spool position of the head side valve Vlh and a rod side valve position sensor Xlr for sensing the spool position of the rod side flow control valve Vlr. In one embodiment, Xlh and Xlr are LVDT type position sensors. The lift cylinder control node 32 also includes a pressure sensor Plh2 for sensing the pressure of the head side 70 of the boom cylinder 60, and a pressure sensor Plr for sensing the hydraulic pressure at the rod side 72 of the boom cylinder 60. The lift cylinder control node 32 further includes a component level controller Cl that interfaces with the various sensors of the lift cylinder control node 32. The component controller Cl also interfaces with the supervisory controller 24. The component controller Cl controls the operation of the valves Vlh, Vlr based on demand signals (e.g., mode, pressure, spool position demands, etc.) sent to the component controller Cl by the supervisory controller 24 and based on feedback provided by the sensors of the lift cylinder control node 32. The component controller Ll also monitors the fault conditions that may arise within the lift cylinder control node 32 and reports such fault conditions to the supervisory controller 24 as raised fault flags.

The boom suspension system control node 34 is in fluid communication with the one or more pumps of the pump control node 28 and is configured to selectively place an accumulator 66 in fluid communication with the one or more pumps to charge the accumulator 66. The boom suspension system control node 34 can also place the accumulator 66 in fluid communication with the tank 77 and/or the head side 70 of the lift cylinder 60.

The boom suspension system control node 34 includes a charge valve Vc and a damping valve Vd. The charge valve Vc can be used to charge the accumulator 66 by placing the accumulator 66 in fluid communication with a pump of the pump control node 28. The damping valve Vd is used to selectively place the accumulator 66 in fluid communication with a head side 70 of the boom cylinder 60. The boom suspension system control node 34 further includes a charge valve position sensor Xc that senses the spool position of the charge valve Vc. The boom suspension system control node 34 also includes a damping valve position sensor Xd that senses a position of the damping valve Vd. The boom suspension system control node 34 further includes a pressure sensor Pa that senses a pressure of the accumulator 66, and a pressure sensor Plh1 that senses the pressure at the head side 70 of the boom cylinder 60. The sensors of the boom suspension system control node 34 interface with a node controller Cbss which provides node level control of the boom suspension system control node 34. The controller Cbss interfaces with the supervisory controller 24 and reports fault conditions within the node to the supervisory controller 24 as raised fault flags. The controller sends operational commands (e.g., mode, pressure, spool position demands, etc.) to the valves.

The optional tank control unit node 36 includes a tank flow control valve Vt that controls system flow to the system tank 77. The tank control unit node 36 also includes a pressure sensor Pt that senses the pressure of the system tank 77 at a location upstream from the valve Vt. A position sensor Xt senses a position of the valve Vt. A component controller Ct is provided for controlling operation of the valve Vt. The component controller Ct interfaces with the sensors of the mode and also interfaces with the supervisory controller 24. Operation of the valve Vt is controlled by the component controller Ct based on commands (e.g., mode, pressure, spool position demands, etc.) received from the supervisory controller 24 and feedback from the node sensors. The component controller Ct monitors operation of the node and reports any failure conditions to the supervisory controller 24.

Establish Reference Pressure Sensor Procedure

Figure 4:
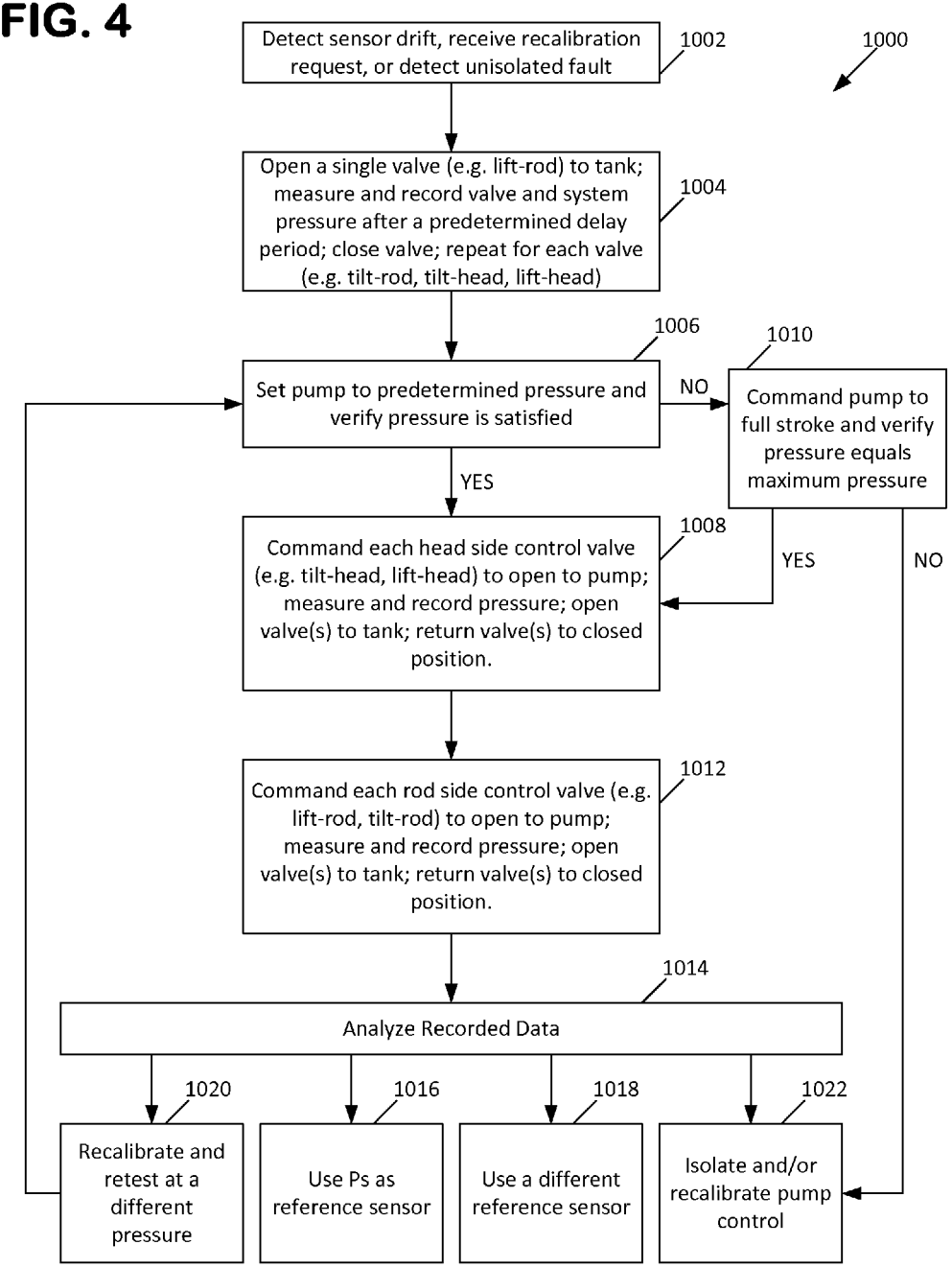
FIG. 4 is a process flow chart showing a procedure in which a pressure sensor in the system shown in FIG. 3 is established as a reference sensor in a fault isolation procedure.
Figure 7:
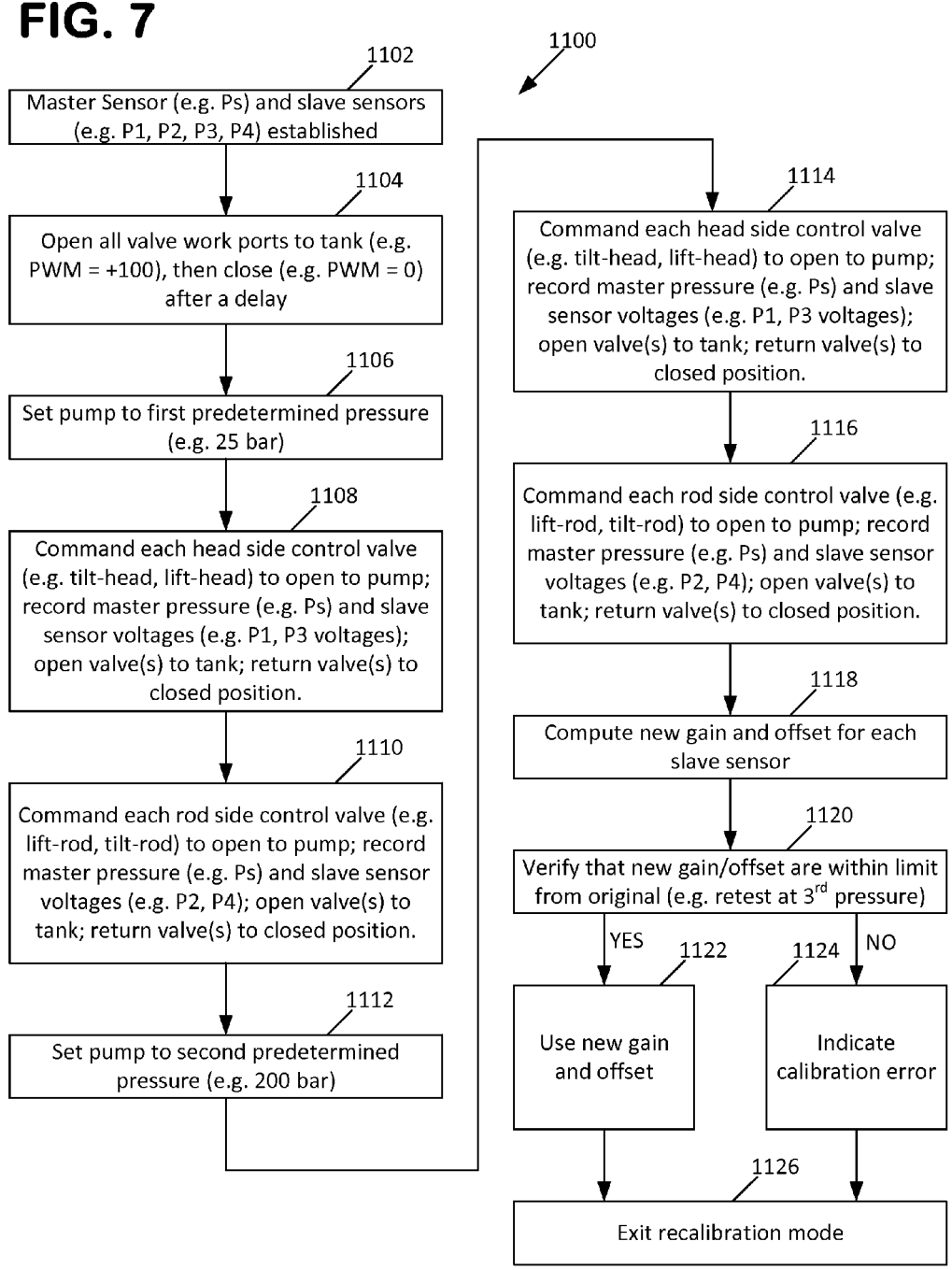
FIG. 7 is a process flow chart showing a procedure in which the pressure sensors can be recalibrated online.

Referring to FIG. 4, a procedure 1000 is initiated in which a master reference pressure sensor is established for use in the recalibration procedure 1100 of FIG. 7. Procedure 1000 may also be used to establish a master pressure sensor for use in an isolation procedure as well. It is noted that although the figures diagrammatically show steps in a particular order, the described procedures are not necessarily intended to be limited to being performed in the shown order. Rather at least some of the shown steps may be performed in an overlapping manner, in a different order and/or simultaneously.

In a first step 1002 of the method 1000, the electronic controller 50 detects that one or more sensors have drifted. In addition or alternatively, the electronic controller 50 receives a request to recalibrate the sensors. In another circumstance, an un-isolated fault is detected somewhere within the controller(s), the work circuit, or another related system associated with work machine 22. Because many electro-hydraulic systems may contain complex algorithms dependent upon a large number of sensors and inputs, a fault condition is frequently identified before the actual fault is isolated. As such, step 1002 can reflect the initial condition where it is known that a fault has occurred, but it is not known what component(s) are actually responsible for triggering the fault. Accordingly, the recalibration process 1100, discussed later, can be used after method 1000 is completed as a first approach to resolving the fault without having to resort to an off-line fault isolation process and/or a stand-alone process to recalibrate the sensors after unacceptable sensor drift has been detected.

At step 1004, while the system is still on-line, each of the tilt and lift valves (Vth, Vtr, Vlh, Vlr) are sequentially opened to the tank 77 with the tank valve Vt, where provided, in the open position. For each valve, the associated pressure at the valve and the system pressure are recorded. Optionally, a predetermined delay after opening the valve to tank may be implemented before recording the pressure. Once the pressures are recorded, the valve is commanded to the closed or neutral position and the next valve is opened to the tank.

As an example illustration of step 1004, the following order could be used after valve Vt, where provided, is opened: (1) command valve Vth to open to the tank 77, sense and record the pressure at Pth and Ps after a predetermined delay, command valve Vth to the closed position; (2) command valve Vtr to open to the tank 77, sense and record the pressure at Ptr and Ps after a predetermined delay, command valve Vtr to the closed position; (1) command valve Vlh to open to the tank 77, sense and record the pressure at Plh2 and Ps after a predetermined delay, command valve Vlh to the closed position; (2) command valve Vlr to open to the tank 77, sense and record the pressure at Plr and Ps after a predetermined delay, command valve Vlr to the closed position. One skilled in the art will understand, upon learning the concepts presented herein, that other valve orders are possible.

At step 1006, the pump 29 of the pump control node 28 responsible for providing fluid pressure to the hydraulic circuit is commanded to a predetermined pressure set point. Where the pressure sensor Ps indicates that the system pressure equals the predetermined pressure, the procedure moves to step 1008. Where the system pressure does not equal the predetermined pressure set point, a further evaluation may be necessary. In the signal from sensor Ps is unstable and below the minimum calibration pressure, a fault within the pump control node 28 may exist. Where the signal from sensor Ps is stable and above the minimum calibration pressure, a number of potential faults may exists, for example an pump control node fault, a hydraulic short, and/or a steering demand fault.

In either case, where pump 29 is unable to meet the pressure set point, the system will command the pump 29 to full stroke or maximum output at step 1010 where the pump pressure at Ps is calibrated against the pressure compensator associated with the pump 29. Where it is determined that Ps equals the maximum pressure of the compensator, then the procedure is allowed to proceed to step 1008. Where the pressure at Ps is not equal to the expected maximum compensator pressure, the procedure moves to step 1022 where a fault in the pump control node 28 must be isolated and/or recalibrated. If, after step 1022 is completed and further faults exist, the procedure may be reinitiated at step 1006 where the proper operation of the pump 29 and node 28 can be verified before proceeding to step 1008.

At step 1008, the head side valves Vth, Vlh of the tilt and lift actuators 60, 64 are commanded to open to the pump 29. Once opened, and after an optional time delay, the pressures at the Pth; Plh2; and Ps are recorded. Subsequently, valves Vth, Vlh are opened to the tank and then placed in the closed position after an optional time delay. By only opening valves on one side of each actuator 60, 64 it can be better assured that no movement of a load occurs. It is also noted that the while actuators 60, 64 are shown as being linear actuators, they may also be hydraulic motors.

At step 1012, the rod side valves Vtr, Vlr of the tilt and lift actuators 60, 64 are commanded to open to the pump 29. Once opened, and after an optional time delay, the pressures at the Ptr; Plr; and Ps are recorded. Subsequently, valves Vth, Vlh are opened to the tank and then placed in the closed position after an optional time delay.

At step 1014, the recorded data is analyzed to determine if Ps, or another sensor, can be used as a trusted reference sensor for recalibration. Four outcomes are shown as being possible from the analysis: (1) Ps can be trusted and will be used as a reference sensor—outcome 1016; (2) Ps cannot be trusted, but Pls+margin can be trusted and will be used as a reference sensor—outcome 1018; (3) a recalibration can be implemented, after which the procedure returns back to step 1006 to determine if Ps can be trusted—outcome 1020; or there is an apparent fault in the pump control node 28 which must be isolated or corrected—outcome 1022.

Referring to FIGS. 5-6, a decision chart 1014a, 1014b (hereafter referred to collectively as chart 1014) is shown that can be used in analysis step 1014 to determine which of outcomes 1016-1022 result. In the analysis step 1014, Ps is initially compared to readings from the other pressure sensors. The decision chart, as disclosed, includes condition data that utilizes different threshold values for these reading differences. For example, a fault condition will be identified if the difference is more than a first threshold, for example 6 bar. A calibration condition can be identified if the difference is more than a second threshold, but less than the first threshold, for example, the difference is between 2 bar and 6 bar. Where the difference is less than the second threshold value, then the difference is small enough to not trigger either a fault condition or a calibration condition. It should be understood that more or fewer threshold conditions could be utilized and that different numerical values may be used for the threshold values in analysis step 1014 without departing from the concepts herein.

Referring to chart 1014, an action is described for each possible data analysis result based on the number and combination of fault and calibration conditions identified. It is noted that the particular cases described in the paragraphs below are directed to a system with four valves (Vth, Vtr, Vlh, Vlr) with pressure sensors (Pth, Ptr, Plh2, Plr), a system pressure sensor (Ps), and a load sense pressure sensor (Pls). The decision chart 1014 can be modified as necessary to account for other cases that would arise from other system configurations.

Case 1 is an analysis result where no faults are identified relative to Ps. In this case, Ps can be taken to be trusted and used as a reference, and outcome 1016 results.

Case 2 is an analysis result where only one fault is identified relative to Ps. In this case, it is still acceptable to use Ps as a trusted reference, and outcome 1016 results. It is noted that any subsequent recalibration or isolation procedure can be configured to start with an evaluation of the sensor associated with the fault condition.

Case 3 is an analysis result where two faults relative to Ps are identified in the same service, meaning that two faults are identified that are both either associated with lift actuator 60 or tilt actuator 64. In this case, it is still acceptable to use Ps as a trusted reference, and outcome 1016 results. It is noted that any subsequent recalibration or isolation procedure will start with an evaluation of the sensors associated with the fault condition.

Case 4 is an analysis result where two faults relative to Ps are identified in different services. Where Ps is equal to Pls plus a predetermined margin (i.e. Pls+margin), then it is acceptable to use Ps as a trusted reference, and outcome 1016 results. However, where this is not the case, then the pump control node 28 must be isolated or corrected under outcome 1022 before any further steps can be taken.

Case 5 is an analysis result where three faults relative to Ps are identified. If the three faulted sensors agree with Pls+margin, where the margin is estimated from the average of the three faulted sensors, then outcome 1018 results and Pls+margin can be trusted and used for the recalibration. However, where this is not the case, then the pump control node 28 must be isolated or corrected under outcome 1022 before any further steps can be taken.

Case 6 is an analysis result where four faults relative to Ps are identified, meaning that none of the pressure sensors agree with Ps. If the four faulted sensors agree with Pls+margin, where the margin is estimated from the average of the three faulted sensors, then outcome 1018 results and Pls+margin can be trusted and used for the recalibration. However, where this is not the case, then the pump control node 28 must be isolated or corrected under outcome 1022 before any further steps can be taken. If the standard deviation of the four faulted sensors is clustered, then a fault likely exists with the Ps or Pls sensors.

Case 7 is an analysis result where one fault condition and two calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the two calibrations and the one good sensor and/or with reference to a master reference sensor.

Case 8 is an analysis result where one fault condition and three calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the three calibrations and/or with reference to a master reference sensor.

Case 9 is an analysis result where one fault condition and one calibration condition are identified relative to Ps in the same service, meaning that two faults are identified that are both either associated with lift actuator 60 or tilt actuator 64. In this case, it is still acceptable to use Ps as a trusted reference, and outcome 1016 results. It is noted that any subsequent recalibration or isolation procedure can be configured to start with an evaluation of the sensor associated with the fault condition.

Case 10 is an analysis result where once fault condition and one calibration condition relative to Ps are identified in different services. Where Ps is equal to Pls plus a predetermined margin (i.e. Pls+margin), then it is acceptable to use Ps as a trusted reference, and outcome 1016 results. However, where this is not the case, then the pump control node 28 must be isolated or corrected under outcome 1022 before any further steps can be taken.

Case 11 is an analysis result where two fault conditions on the same service and one calibration condition relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the one calibration condition sensor and/or with reference to a master reference sensor.

Case 12 is an analysis result where two fault conditions on a different service and one calibration condition relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the one calibration condition sensor and the one good sensor and/or with reference to a master reference sensor.

Case 13 is an analysis result where two fault conditions and two calibration conditions relative to Ps are identified. If the four faulted/calibration sensors agree with Pls+margin, where the margin is estimated from the average of the four faulted/calibration sensors, then outcome 1018 results and Pls+margin can be trusted and used for the recalibration. However, where this is not the case, then the pump control node 28 must be isolated or corrected under outcome 1022 before any further steps can be taken. If the standard deviation of the four faulted/calibration sensors is clustered, then a fault likely exists with the Ps or Pls sensors.

Case 14 is an analysis result where three fault conditions and one calibration condition relative to Ps are identified. If the three faulted sensors agree with Pls+margin, where the margin is estimated from the average of the three faulted sensors, then outcome 1018 results and Pls+margin can be trusted and used for the recalibration. However, where this is not the case, then the pump control node 28 must be isolated or corrected under outcome 1022 before any further steps can be taken.

Case 15 is an analysis result where three calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the lift head side sensor reading, to the nearest calibration condition sensor, and/or to a selected master reference sensor.

Case 16 is an analysis result where four calibration conditions relative to Ps are identified. In this instance, outcome 1020 results and a recalibration of Ps can be implemented, after which the procedure returns back to step 1006 to determine if Ps can be trusted, but with the system at a different pressure. The recalibration of Ps can be performed with reference to the lift head side sensor reading, to the nearest calibration condition sensor, and/or to a selected master reference sensor.

Case 17 is an analysis result where one calibration condition relative to Ps is identified. In this instance, the recalibration can be continued under outcome 1016 or the calibration condition sensor can be recalibrated relative to Ps under outcome 1020. Where it is chosen to recalibrate the calibration condition sensor, the procedure returns back to step 1006 after recalibration to determine if Ps can be trusted, but with the system at a different pressure.

Case 18 is an analysis result where two calibration conditions relative to Ps in the same service are identified. In this instance, outcome 1020 can result and a recalibration of the two calibration condition sensors can be implemented, after which the procedure returns back to step 1006 to determine if Ps can be trusted, but with the system at a different pressure. The recalibration of the two calibration condition sensors can be with reference to Ps. Alternatively, the recalibration can be continued under outcome 1016 without recalibrating the two sensors associated with the calibration conditions.

Case 19 is an analysis result where two calibration conditions relative to Ps in a different service are identified. In this instance, outcome 1020 can result and a recalibration of the two calibration condition sensors can be implemented, after which the procedure returns back to step 1006 to determine if Ps can be trusted, but with the system at a different pressure. The recalibration of the two calibration condition sensors can be with reference to Ps. Alternatively, the recalibration can be continued under outcome 1016 without recalibrating the two sensors associated with the calibration conditions.

It is to be understood that the above described cases are exemplary in nature and that other case conditions and corresponding actions may be chosen without departing from the concepts presented herein.

Online Pressure Sensor Recalibration

Once a reference sensor has been established, the online sensor recalibration process 1100 may be implemented, as shown at FIG. 7. It is noted that although two three-way valves are shown for the tilt and lift actuators, one four-way valve could be used instead wherein one four-way valve is associated with each actuator. Also, four two-way valves could be used. In such a case the function of Vth and Vtr would be embodied in a single valve as would the function of Vlh and Vlr. One skilled in the art, upon learning of the disclosure of this application, will understand that processes 1000 and 1100 can also be performed with either two-way valves, four-way valves, another type of valve, and combinations thereof without departing from the concepts presented herein. Furthermore, processes 1000 and 1100 can be applied to systems having more than tilt and lift actuator functions.

In a first step 1102 of the process, a master sensor and slave sensors are established. Where the above described protocol for establishing a reference sensor has been utilized, the master sensor is the trusted reference sensor and the slave sensors are the remaining sensors.

In a step 1104, each of the tilt and lift valves (Vth, Vtr, Vlh, Vlr) are opened to the tank 77 with the tank valve Vt, where provided, in the open position. After a delay, the valves are commanded to the closed or neutral position and the next valve is opened to the tank.

At step 1106, the pump 29 of the pump control node 28 responsible for providing fluid pressure to the hydraulic circuit is commanded to a first predetermined pressure set point, for example 25 bar.

At step 1108, the head side valves Vth, Vlh of the tilt and lift actuators 60, 64 are commanded to open to the pump 29. Once opened, and after an optional time delay, the master pressure (e.g. Ps) is recorded, as are the slave sensor voltages (e.g. Pth, Plh2). Subsequently, valves Vth, Vlh are opened to the tank and then placed in the closed position after an optional time delay. By only opening valves on one side of each actuator 60, 64 it can be better assured that no movement of a load occurs. However, it should be understood that this results when using two valves per actuator and not necessarily when using a single four-way valve for each actuator.

At step 1110, the rod side valves Vtr, Vlr of the tilt and lift actuators 60, 64 are commanded to open to the pump 29. Once opened, the master pressure (e.g. Ps) is recorded, as are the slave sensor voltages (e.g. Ptr, Plr). Subsequently, valves Vtr, Vlr are opened to the tank and then placed in the closed position after an optional time delay.

At step 1112, the pump 29 of the pump control node 28 responsible for providing fluid pressure to the hydraulic circuit is commanded to a second predetermined pressure set point, for example 200 bar.

At step 1114, the head side valves Vth, Vlh of the tilt and lift actuators 60, 64 are commanded to open to the pump 29. Once opened, and after an optional time delay, the master pressure (e.g. Ps) is recorded, as are the slave sensor voltages (e.g. Pth, Plh2). Subsequently, valves Vth, Vlh are opened to the tank and then placed in the closed position after an optional time delay. By only opening valves on one side of each actuator 60, 64 it can be better assured that no movement of a load occurs.

At step 1116, the rod side valves Vtr, Vlr of the tilt and lift actuators 60, 64 are commanded to open to the pump 29. Once opened, the master pressure (e.g. Ps) is recorded, as are the slave sensor voltages (e.g. Ptr, Plr). Subsequently, valves Vtr, Vlr are opened to the tank and then placed in the closed position after an optional time delay.

Once the above information has been acquired, a new gain and offset for each slave sensor can be computed using known methods under step 1118. Optionally, the new gain and offset can be verified at a step 1120 which may include repeating steps 1112 to 1116 at a different, third pressure. If it is determined that the new gain and offset are correct and/or should be used under step 1122, the recalibration mode can then be exited at step 1126. If it is determined that the new gain and offset are incorrect a calibration error can be indicated at step 1124 and the recalibration mode can be exited under step 1126.

Online Position Sensor Recalibration

Figure 8:
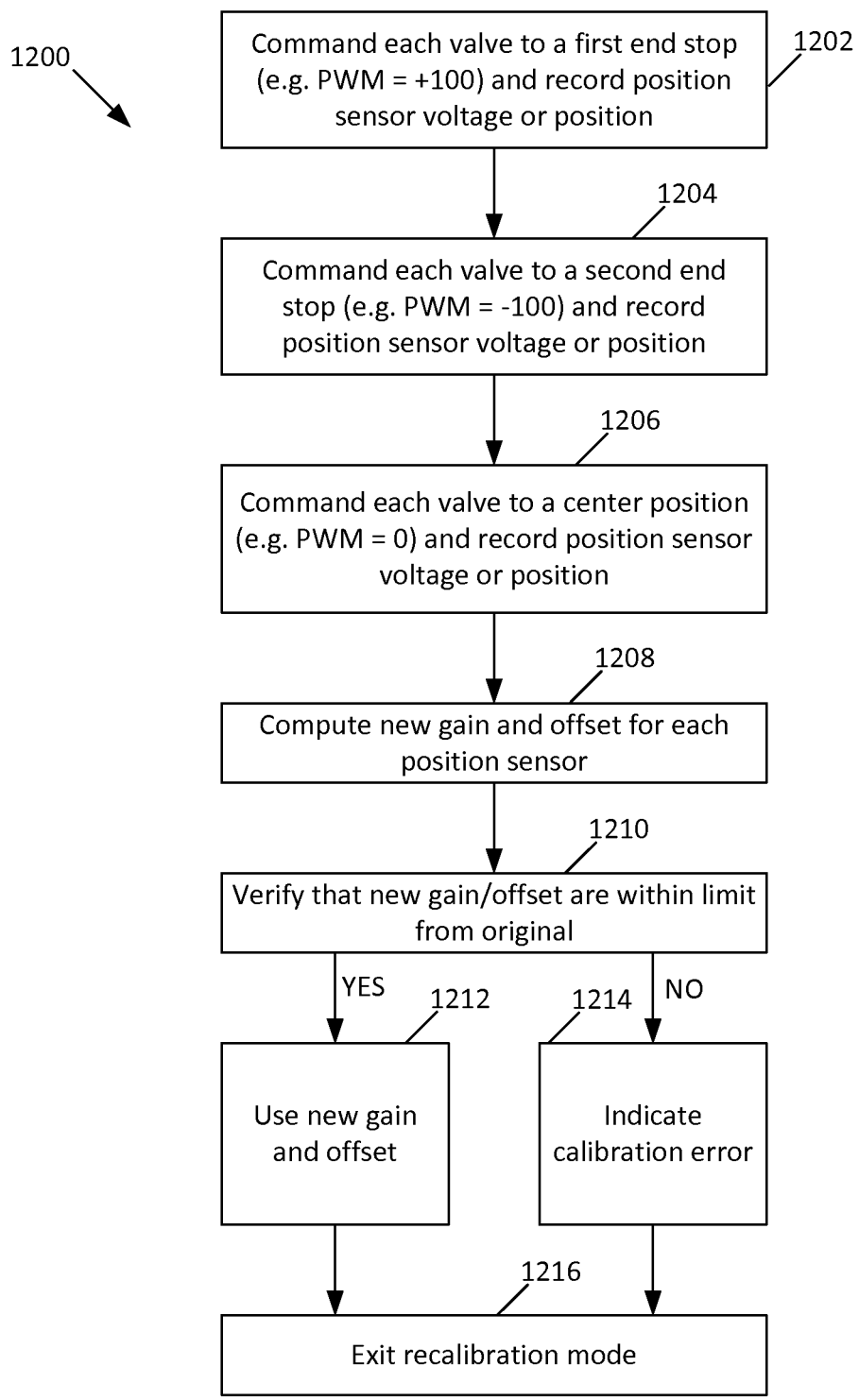
FIG. 8 is a process flow chart showing a procedure in which the position sensors can be recalibrated online.

The position sensors Xth, Xtr, Xlh, Xlr associated with the lift and tilt valves can also be recalibrated online by using end stop readings and stored end stop values. With reference to FIG. 8, a position sensor recalibration process 1200 is shown. In a step 1202, the valves are commanded sequentially or simultaneously to a first end stop and the position or voltage from the corresponding position sensor is recorded. In a step 1204, the valves are commanded sequentially or simultaneously to a second opposite end stop and the position or voltage from the corresponding position sensor is recorded. In a step 1206, in cases where the valve center position can be trusted to remain constant, the valves are commanded to a center position, and the position voltage from the corresponding position sensor is also recorded. It is noted that each of steps 1202, 1204, and 1206 can be performed in conjunction with the online pressure sensor recalibration process 1100 since the same valves will be placed in the desired position for position sensor recalibration during process 1100.

Once the above information has been acquired, a new gain and offset for each slave sensor (e.g.) can be computed using known methods under step 1208. Optionally, the new gain and offset can be verified at a step 1210 which may include repeating steps 1202 to 1206 with the new gain and offset. If it is determined that the new gain and offset are correct and/or should be used under step 1212, the recalibration mode can then be exited at step 1216. If it is determined that the new gain and offset are incorrect a calibration error can be indicated at step 1214 and the recalibration mode can be exited under step 1216.

In order to enhance the accuracy of the recalibration process 1200, the hydraulic fluid temperature at which the stored end stop values were recorded can be taken into account during step 1208. Likewise, accuracy is increased if the recalibration of the position sensors can be performed at a temperature that is within an acceptable range of the temperature present when the end stop positions were stored. Also, where the valve center position can be trusted to remain constant, a three-point calibration is possible using step 1206. Where a two-point calibration is used, a linear adjustment to the existing calibration can be used.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An online method for reconfiguring pressure sensors in a hydraulic system comprising the steps of:
    (a) providing an electro-hydraulic system comprising a control system, a system pump, a system pump pressure sensor, a first valve having a first pressure sensor in fluid communication with a first side of a first actuator, a second valve having a second pressure sensor in fluid communication with a second side of the first actuator, a third valve having a third pressure sensor in fluid communication with a first side of a second actuator, and a fourth valve having a fourth pressure sensor in fluid communication with the second side of the second actuator;
    (b) detecting at least one of a sensor drift condition, a recalibration request, and an unisolated fault condition;
    (c) verifying that the system pump pressure sensor or another pressure sensor can be trusted as a master reference sensor;
    (d) measuring and recording a first pressure reading at the master reference sensor and first voltage readings associated with the first, second, third, and fourth pressure sensors at a first pump pressure set point;
    (e) measuring and recording a second pressure reading at the master reference sensor and second voltage readings associated with the first, second, third, and fourth pressure sensors at a second pump pressure set point; and
    (f) computing a new gain and offset for each of the first, second, third, and fourth pressure sensors based on a comparison of the recorded first and second pressure readings with respect to the master reference sensor and the recorded first and second voltage readings.

2. The online method for reconfiguring pressure sensors in a hydraulic system of claim 1, wherein the step of verifying that the system pump pressure sensor or the another pressure sensor can be trusted as a master reference sensor includes:
    (a) setting the pump to a predetermined pressure;
    (b) commanding the first and third valves to open to the system pump and recording pressures sensed at the system pump pressure sensor, first, and third pressure sensors;
    (c) closing the first and third valves;
    (d) commanding the second and fourth valves to open to the system pump and recording pressures sensed at the system pump pressure sensor, second, and fourth pressure sensors; and
    (e) analyzing the recorded pressures against predefined condition data stored in the control system.

3. The online method for reconfiguring pressure sensors in the hydraulic system of claim 2, wherein the condition data includes fault condition data.

4. The online method for reconfiguring pressure sensors in the hydraulic system of claim 3, wherein the condition data includes calibration condition data.

5. The online method for reconfiguring pressure sensors in the hydraulic system of claim 1, where each of the pressure sensors is a strain-based pressure sensor.

6. The online method for reconfiguring pressure sensors in the hydraulic system of claim 1, wherein the first actuator is a lift cylinder and the second actuator is a tilt cylinder of a work machine.

7. A method for identifying a recalibration reference sensor in a hydraulic system comprising the steps of:
(a) providing an electro-hydraulic system comprising a control system, a system pump, a system pump pressure sensor, a first valve having a first pressure sensor in fluid communication with a first side of a first actuator, a second valve having a second pressure sensor in fluid communication with a second side of the first actuator, a third valve having a third pressure sensor in fluid communication with a first side of a second actuator, and a fourth valve having a fourth pressure sensor in fluid communication with the second side of the second actuator;
(b) setting the pump to a predetermined pressure;
(c) commanding the first and third valves to open to the system pump and recording pressures sensed at the system pump pressure sensor, first, and third pressure sensors;
(d) closing the first and third valves;
(e) commanding the second and fourth valves to open to the system pump and recording pressures sensed at the system pump pressure sensor, second, and fourth pressure sensors; and
(f) analyzing the recorded pressures against predefined condition data stored in the control system.

8. The method for identifying a recalibration reference sensor of claim 7, wherein the condition data includes fault condition data.

9. The method for identifying a recalibration reference sensor of claim 8, wherein the condition data includes calibration condition data.

10. The method for identifying a recalibration reference sensor of claim 7, where each of the pressure sensors is a strain-based pressure sensor.

11. The method for identifying a recalibration reference sensor of claim 7, wherein the first actuator is a lift cylinder and the second actuator is a tilt cylinder of a work machine.

12. An online method for reconfiguring pressure sensors in a hydraulic system comprising the steps of:
(a) providing an electro-hydraulic system comprising a control system, a system pump, a system pump pressure sensor, and a plurality of control valves wherein each of the valves has at least one corresponding pressure sensor in fluid communication with an actuator;
(b) detecting at least one of a sensor drift condition, a recalibration request, and an unisolated fault condition;
(c) verifying that the system pump pressure sensor or another pressure sensor can be trusted as a master reference sensor;
(d) measuring and recording a first pressure reading at the master reference sensor and first voltage readings associated with the plurality of pressure sensors at a first pump pressure set point;
(e) measuring and recording a second pressure reading at the master reference sensor and second voltage readings associated with the plurality of pressure sensors at a second pump pressure set point; and
(f) computing a new gain and offset for each of the plurality of pressure sensors based on a comparison of the recoded first and second pressure readings with respect to the master reference sensor and the recorded first and second voltage readings.

13. The online method for reconfiguring pressure sensors in a hydraulic system of claim 12, wherein the step of verifying that the system pump pressure sensor or the another pressure sensor can be trusted as a master reference sensor includes:
(a) setting the pump to a predetermined pressure;
(b) commanding the plurality of valves to open to the system pump and recording pressures sensed at the system pump pressure sensor and the pressure sensors corresponding to the plurality of valves; and
(c) analyzing the recorded pressures against predefined condition data stored in the control system.

14. The online method for reconfiguring pressure sensors in a hydraulic system of claim 13, wherein the step of commanding the plurality of valves to open to the system pump and recording pressures sensed at the system pump pressure sensor and the pressure sensors corresponding to the plurality of valves is performed sequentially and repeated for at least some of the plurality of valves.

15. The online method for reconfiguring pressure sensors in a hydraulic system of claim 12, further comprising the steps of:
(a) commanding the plurality of valves to move to a first end stop position and a second end stop position;
(b) recording end stop voltages at each of the end stop positions for position sensors associated with the plurality of valves;
(c) computing a new gain and offset for each of the plurality of position sensors based on a comparison of the recorded end stop voltages with respect to stored end stop position data; and
(d) recalibrating the position sensors with the new gain and offset for each position sensor.

* * * * *